April 17, 1934.   E. BERNITZ, SR   1,954,795
MEANS AND METHOD OF PROTECTING TREES FROM CRAWLING INSECTS
Filed Aug. 30, 1932

Inventor
ERNEST BERNITZ SR
By A.B.Bowman
Attorney

Patented Apr. 17, 1934

1,954,795

UNITED STATES PATENT OFFICE 1,954,795

MEANS AND METHOD OF PROTECTING TREES FROM CRAWLING INSECTS

Ernest Bernitz, Sr., La Mesa, Calif.

Application August 30, 1932, Serial No. 631,010

10 Claims. (Cl. 47—24)

My invention relates to means and method of protecting trees from insects of all kinds and characters crawling up the body of the tree from the ground, and the objects of my invention are:

First, to provide a substantial guard around the body of the tree to prevent insects of all classes from crawling up the body of the tree from the ground;

Second, to provide a barrier for insects crawling up the body of a tree which prevents them crawling along in cracks in the bark or from passing over the outer side of the barrier;

Third, to provide a novel method of protecting trees from crawling insects;

Fourth, to provide a novel means and method of this class;

Fifth, to provide a means and method of this class which is so arranged that it will not be greatly affected by rain or the beating sun;

Sixth, to provide a means and method of this class in which a deterrent compound may be used and renewed from time to time as is necessary, and Seventh, to provide a means and method of this class which is very simple and economical of construction, easy to apply, efficient in its action, and which will not readily deteriorate or get out of order.

Figure 1:
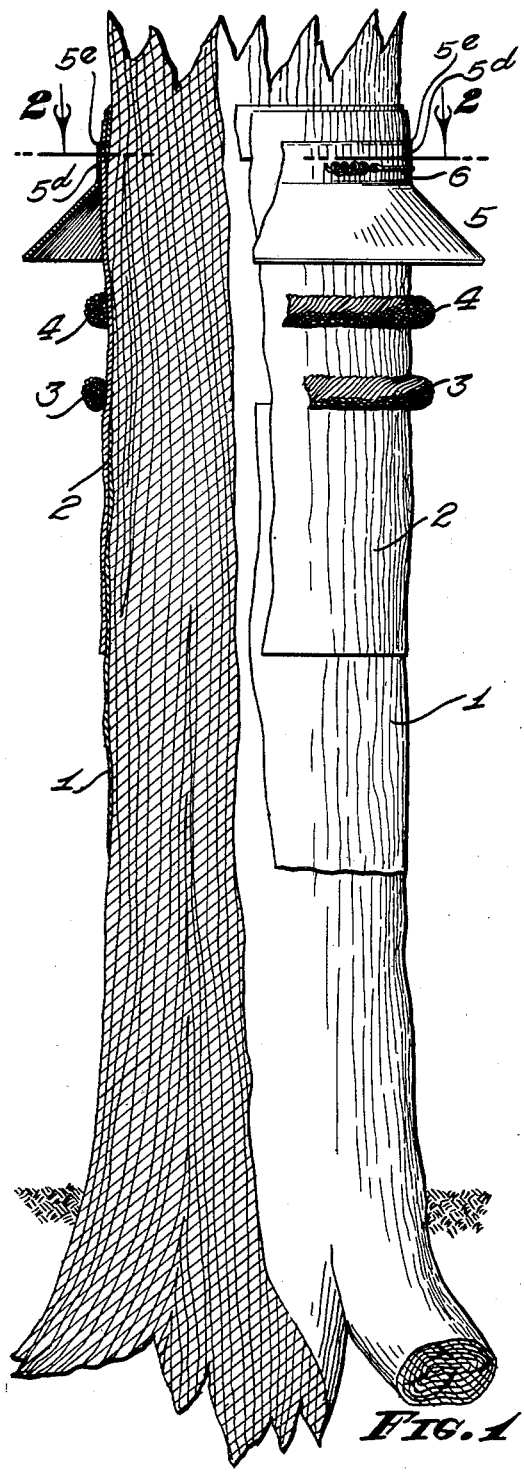
Figure 2:
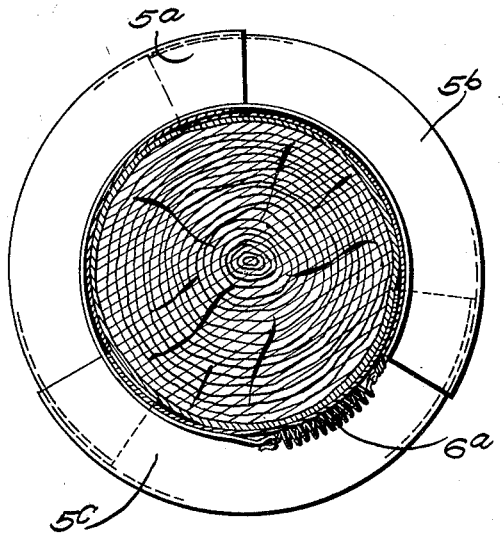

With these and other objects in view as will appear hereinafter, my invention consists of certain novel features of construction, combination and arrangement of parts and portions, and to the novel method as will be hereinafter described in detail and particularly set forth in the appended claims, reference being had to the accompanying drawing and to the characters of reference thereon which form a part of this application, in which:

Figure 1 is a side elevational view of a tree trunk showing my means in operative position thereon and showing a portion of both tree trunk and means broken away and in section to facilitate the illustration, and Fig. 2 is a transverse sectional view through 2—2 of Fig. 1.

Similar characters of reference refer to similar parts and portions throughout the several views of the drawing.

The asphalt 1, felt 2, dry rope 3, saturated rope 4, hood member 5, and hood support 6, constitute the principal parts and portions of my means for protecting trees from crawling insects.

My invention consists in painting the tree trunk near the earth and for some distance upwardly with asphalt emulsion 1 which surrounds the entire surface of the tree and extends some distance along the same longitudinally of the trunk and fills all of the cracks and holes in the trunk and forms a relatively smooth outer surface. Mounted some distance from the lower side of the asphalt surface is a piece of felt 2 which extends upwardly some distance above the upper edge of the asphalt. The edges of this felt overlap to provide for spreading with the gradual growth of the tree. Mounted around this felt on the outer surface thereof is a dry rope 3 some distance from the lower edge thereof and just above this in spaced relation is another rope 4 which is saturated with crude oil or other insect destroying compounds. It will be noted that this dry rope covers or extends around the upper portion of the asphalt and around the felt at this point and it is adapted to receive any seepage or runoff or dripping from the rope 4 and absorb the same. Mounted above this saturated rope 4 is a hood member 5 which is made in overlapping sections 5a, 5b and 5c. This is for the purpose of deflecting rain and water coming down from the trunk of the tree and forms a roof or covering over the rope member 4 to prevent deterioration of the compound therein and is made in overlapping sections to permit expansion upon the growth of the tree trunk. This is held in position by means of a wire 6 which is provided with a spring 6a therein to permit expansion. The felt is provided at the upper edge with a seal of asphalt between the upper edge of the felt and the bark of the tree so that water will pass over the same and down over the hood 5.

It will be noted that the vertical portions 5d of the hood sections 5 are provided with inturned upper edges 5e which are adapted to press into the outer surface of the felt so that water passing down the tree will pass directly over the hood and in between the vertical portions 5d and the felt.

The operation of my means and method is as follows: The hood prevents water from deteriorating the compound in the rope member 4 providing a roof to prevent water from engaging the same and also a shade from the sun's rays. The insect destroying compound that might drip or flow from the rope 4 will be taken up by the dry rope 3 and new compound may be supplied for the rope 4 by using a can with spout or other method as desired and re-saturating the rope 4 from time to time as needed. The felt is also a preventative because insects do not like to crawl on felt material and therefore avoid the same. The asphalt 1 also serves as a preventative as they do not like to crawl on the asphalt. Furthermore, the asphalt fills holes and cracks in the bark through which the insects might pass on the inside of the felt 2 or rope 3.

Though I have shown and described a particular construction, combination and arrangement of parts and portions and a certain method of protecting trees from crawling insects, I do not wish to be limited to this particular construction, combination and arrangement, nor to the certain method, but desire to include in the scope of my invention the construction, combination and arrangement, and the process substantially as set forth in the appended claims.

Having thus described my invention, what I claim as new and desire to secure by Letters Patent is:

1. A means for protecting trees from crawling insects including an asphalt layer surrounding the trunk of the tree, a layer of felt positioned over the same spaced from the lower side thereof, and an insect destroying compound saturated rope positioned tightly around said felt.

2. A means for protecting trees from crawling insects including an asphalt layer surrounding the trunk of the tree, a layer of felt positioned over the same spaced from the lower side thereof, an insect destroying compound saturated rope positioned tightly around said felt, and another unsaturated rope positioned tightly around said felt below said saturated rope.

3. A means for protecting trees from crawling insects including an asphalt layer surrounding the trunk of the tree, a layer of felt positioned over the same spaced from the lower side thereof, an insect destroying compound saturated rope positioned tightly around said felt, another unsaturated rope positioned tightly around said felt below said saturated rope, and a hood member yieldably supported around said felt above said saturated rope.

4. A means for protecting trees from crawling insects including an asphalt layer surrounding the trunk of the tree, a layer of felt positioned over the same spaced from the lower side thereof, an insect destroying compound saturated rope positioned tightly around said felt, another unsaturated rope positioned tightly around said felt below said saturated rope, a hood member yieldably supported around said felt above said saturated rope, and an asphalt sealing between the upper edge of said hood and the tree trunk.

5. In a means of the class described a felt member wrapped around a tree trunk with its edges overlapping, an absorbent member saturated with an insect destroying compound securing said felt around said tree trunk, and a similar unsaturated absorbent member spaced apart therefrom around said felt.

6. In a means of the class described a felt member wrapped around a tree trunk with its edges overlapping, an absorbent member saturated with an insect destroying compound securing said felt around said tree trunk, a similar unsaturated absorbent member spaced apart therefrom around said felt, and a hood member mounted tightly around said felt above said saturated member.

7. In a means of the class described a felt member wrapped around a tree trunk with its edges overlapping, an absorbent member saturated with an insect destroying compound securing said felt around said tree trunk, a similar unsaturated absorbent member spaced apart therefrom around said felt, a hood member mounted tightly around said felt above said saturated member, and resilient means for holding said hood tightly on said felt.

8. The herein described method of protecting trees consisting in painting the surface of the tree trunk with asphalt emulsion, then placing a sheet of felt over the upper portion of said painted surface, then supporting said felt thereon by an insect destroying saturated member.

9. The herein described method of protecting trees consisting in painting the surface of the tree trunk with asphalt emulsion, then placing a sheet of felt over the upper portion of said painted surface, then supporting said felt thereon by an insect destroying saturated member, then placing a yieldable hood around the tree trunk above said saturated member.

10. The herein described method of protecting trees consisting in painting the surface of the tree trunk with asphalt emulsion, then placing a sheet of felt over the upper portion of said painted surface, then supporting said felt thereon by an insect destroying saturated member, then placing a yieldable hood around the tree trunk above said saturated member, then sealing the joint between said hood and the tree trunk.

ERNEST BERNITZ, Sr.